US011464172B2

(12) United States Patent
Sepulveda (10) Patent No.: US 11,464,172 B2
(45) Date of Patent: Oct. 11, 2022

(54) HORTICULTURAL SMUDGING SYSTEM AND METHOD

(71) Applicant: Homero Sepulveda, Kingwood, TX (US)

(72) Inventor: Homero Sepulveda, Kingwood, TX (US)

( * ) Notice: Subject to any disclaimer, the term of this patent is extended or adjusted under 35 U.S.C. 154(b) by 449 days.

(21) Appl. No.: 16/750,366

(22) Filed: Jan. 23, 2020

(65) Prior Publication Data

US 2020/0236861 A1     Jul. 30, 2020

Related U.S. Application Data

(60) Provisional application No. 62/797,276, filed on Jan. 27, 2019.

(51) Int. Cl.
| | |
|---|---|
| *A01G 7/02* | (2006.01) |
| *A01G 9/24* | (2006.01) |
| *A01N 59/04* | (2006.01) |
| *F23N 3/00* | (2006.01) |
| *F23N 5/24* | (2006.01) |
| *F23N 5/00* | (2006.01) |
| *F23N 3/06* | (2006.01) |

(52) U.S. Cl.
CPC ............ *A01G 7/02* (2013.01); *A01G 9/24* (2013.01); *A01N 59/04* (2013.01); *F23N 3/002* (2013.01); *F23N 3/005* (2013.01); *F23N 3/06* (2013.01); *F23N 5/003* (2013.01); *F23N 5/006* (2013.01); *F23N 5/242* (2013.01); *F23N 2225/04* (2020.01); *F23N 2235/02* (2020.01)

(58) Field of Classification Search
CPC . A01G 7/02; A01G 9/24; A01G 13/06; A01G 13/065; A01G 13/08; A01N 59/04; F23N 3/002; F23N 3/005; F23N 3/06; F23N 5/003; F23N 5/006; F23N 5/242; F23N 2225/04; F23N 2235/02
USPC .......................................................... 236/1 r
See application file for complete search history.

(56) References Cited

U.S. PATENT DOCUMENTS

| | | | | |
|---|---|---|---|---|
| 1,054,897 | A * | 3/1913 | Bell ................... | A01G 13/06 126/59.5 |
| 1,111,993 | A * | 9/1914 | Carder ................ | A01G 13/06 47/2 |
| 1,162,975 | A * | 12/1915 | Burke et al. ........ | A01M 1/2066 43/127 |
| 2,374,955 | A | 5/1945 | Raper | |

(Continued)

FOREIGN PATENT DOCUMENTS

CN        1067413 C     7/1997

OTHER PUBLICATIONS

Jiang, et al., "Negative Air Ions and Their Effects on Human Health and Air Quality Improvement", International Journal of Molecular Sciences, Sep. 28, 2018.

(Continued)

*Primary Examiner* — Justin M Jonaitis (57) ABSTRACT

A horticultural smudging system and method for improving the growth and/or production of plants. Combustible material is burnt within a thermal container, and the resulting flue gas containing negative ions and carbon dioxide is propelled onto one or more plants. The smudging system and method may use one or more sensors to detect oxygen, air pressure, and flue gas levels within the thermal container to adjust air intake and the release of flue gas.

18 Claims, 8 Drawing Sheets

(56) References Cited

U.S. PATENT DOCUMENTS

| | | | | |
|---|---|---|---|---|
| 3,354,579 | A * | 11/1967 | Gross | A01G 13/08 |
| | | | | 47/2 |
| 3,727,345 | A * | 4/1973 | Smith | A01G 13/06 |
| | | | | 47/29.1 |
| 4,026,469 | A * | 5/1977 | Frankel | A01M 7/0014 |
| | | | | 239/78 |
| 4,439,138 | A * | 3/1984 | Craig | F23N 1/022 |
| | | | | 236/15 E |
| 4,513,529 | A * | 4/1985 | Reich | A01G 13/06 |
| | | | | 47/2 |
| 4,615,137 | A | 10/1986 | Radmanovich | |
| 2009/0187484 | A1 | 7/2009 | Arbogast et al. | |
| 2010/0115833 | A1 | 5/2010 | Arbogast | |
| 2014/0166320 | A1 * | 6/2014 | Olsen | A01B 49/065 |
| | | | | 172/60 |

OTHER PUBLICATIONS

Jann, "Negative Ions Create Positive Vibes", WebMD, https://www.webmd.com/balance/features/negative-ions-create-positive-vibes#1, May 6, 2002.

Krueger, et al., "Studies on the Effects of Gaseous Ions on Plant Growth", The Journal of General Physiology, May 1, 1962.

Sneed, "Ask the Experts: Does Rising CO2 Benefit Plants?", Scientific American, Jan. 23, 2018, https://www.scientificamerican.com/article/ask-the-experts-does-rising-co2-benefit-plants1/.

Taljaard, "The Science Behind Smudging", Uplift, Aug, 9, 2017, https://upliftconnect.com/science-behind-smudging/?fbclid=IwAR3kueFDsXyw32KXhTGsbiA7PPeiUxlwdqTqF4c3j9cfHDTEjxsNik-h_WI.

Sullivan, "Ions Created by Winds May Prompt Changes in Emotional States", The New York Times, Oct. 6, 1981, https://www.nytimes.com/1981/10/06/science/ions-created-by-winds-may-prompt-changes-in-emotional-states.html?smid=fb-share&fbclid=lwAR1AQ6IK5QQSBYaUl8eVo_17BFTaeu-yz2c5vBnPRI7Mf-61q8WWRSe_ndg.

"Masonry Heater Health Benefits and Safety", Masonry Heater Builders, http://www.stovemason.com/masonry-heater-health-benefits/.

Kamado Joe Classic II 18-Inch Stand-Alone Ceramic Grill, https://www.bbqguys.com/kamado-joe/2017-classic-ii-18-inch-stand-alone-ceramic-grill.

* cited by examiner

HORTICULTURAL SMUDGING SYSTEM AND METHOD

CROSS-REFERENCE TO RELATED APPLICATIONS

This application claims priority to, and the benefit of, U.S. Provisional Application No. 62/797,276, filed Jan. 27, 2019, titled "A Horticultural Smudging System," which is incorporated herein by reference in its entirety.

BACKGROUND

1. Field of Invention

The present disclosure generally relates to improving the growth and production of plants and, more particularly, to a horticultural smudging system and method for improving the growth and production of plants.

2. Description of the Prior Art

Increasing the growth and production of plants has been a horticultural goal for thousands of years. Achieving that goal requires addressing of a host of challenges, such as improving the quality and content of the soil and surrounding air, encouraging the presence of beneficial insects and microorganisms, and discouraging the presence of deleterious microorganisms, diseases, and pests.

Plants generally absorb the nutrients necessary for growth through the leaves and roots. During photosynthesis plants extract carbon dioxide from the air and convert the carbon into sugars to fuel growth. Plants also absorb other minerals and nutrients from the soil, such as Nitrogen, Phosphorous, and Potassium. If the soil lacks the necessary nutrients, horticulturists often supplement the nutrient content by adding commercial fertilizers, decomposing organic matter (or compost), manure, or a cover crop.

Interactions with insects and microorganisms also affects plant growth and production. These interactions can be both beneficial and detrimental to the plant. For example, pollinators (such as bees) assist in plant fertilization by transporting pollen, resulting in improved fertilization rates and crop yields. Conversely, pest insects such as aphids, cicadas, and beetles can damage plant leaves along with any fruits, vegetables, or other useful products produced by the plant.

Additionally, some microorganisms (such as soil bacteria) are known to benefit plants by improving bioavailability of necessary nutrients in soil through decomposition of organic matter or conversion of compounds in the air (such as Nitrogen) into a form a plant host can use. However, there are also a wide variety of disease causing microorganisms that can be quite damaging to plants which may compete with the more beneficial microorganisms for resources.

SUMMARY

Applicant recognized that past solutions to the goals and challenges discussed above have often been expensive, harmful to the environment, and/or incompatible with organic and sustainable horticultural standards.

Applicant also recognized that horticulturists have historically struggled to strike a balance between eliminating pests and disease causing microorganisms without negatively affecting beneficial insects and microorganisms. Horticulturists have access to a wide array of chemical pesticide, anti-fungal, and anti-bacterial sprays, however those sprays can be just as damaging to the beneficial fauna as they are to the detrimental organisms that they are meant to target.

Furthermore, many horticulturists prefer to use organic and/or natural methods when cultivating their plants. Organic and/or natural methods typically eschew the use of synthetic or man-made chemicals to control pests and disease. Instead, those methods encourage the presence of beneficial microorganisms and natural predators to control the deleterious microorganisms and pest insects.

Some horticulturists also seek to use organic and/or natural methods which may entail reducing or eliminating the use of synthetic fertilizers. Such fertilizers can be costly and may have a negative impact on the environment. Fossil fuels are frequently used to produce fertilizers and transport them to the location they will be used. Additionally, at least a portion of synthetic fertilizer applied to farms and gardens will often be washed away by rain or irrigation. This runoff may pollute natural waterways, where the excess nutrients can cause algae blooms and poison fish.

Therefore, it will be recognized by a person of skill in the art that a need exists for a system and method of increasing the growth and production of plants which can be used in organic and/or natural farming, does not require the use of synthetic fertilizers, discourages disease causing microorganisms and pests, and provides additional nutrients to plants.

In recognition of those problems, Applicant has developed systems, machines, and processes for horticultural smudging to reduce pest insects and disease causing microorganisms and increase the growth and production of plants without the use of fertilizers while still maintaining organic and/or natural horticultural methods. In some embodiments, horticultural smudging involves burning specific horticultural smudging materials including dried plant matter, such as white sage, to produce negative air ions and carbon dioxide to be directed towards one or more plants. Air ions are electrically charged molecules or ions, with negative air ions being those with a negative charge from gaining an electron. Negative air ions may be generated naturally by certain methods, such as the decay of radioactive elements or the Lenard Effect. Negative air ions have been shown to limit the growth and negative effects of harmful pests and microorganisms such as bacteria, and exposure to negative air ions has even been shown to increase the growth of plants. Plants consume carbon dioxide during photosynthesis, and therefore its generation and distribution onto plants may also be beneficial to the growth and production of those plants. Therefore, it will be recognized that by generating air containing a combination of negative air ions and carbon dioxide and directing the combination towards one or more plants, a horticulturist can increase the growth and production of plants without the negative side effects found in prior approaches to fertilization and controlling pests. Furthermore, Applicant has developed systems, machines, and processes for horticultural smudging which can be readily deployed at the site of planting to automatically generate negative air ions and carbon dioxide to increase the growth and production of plants.

In one embodiment, a horticultural smudging system can be used to combust materials continuously during a selected period of time so that flue gas output therefrom passes to contact plants thereby to enhance plant growth and production. The embodiment may include a thermal container to burn combustible smudging materials, such as white sage, to generate flue gas containing negative ions and carbon dioxide. The portions of the thermal container that come in contact with the flue gas may be constructed at least partially of a non-conductive material, such as stone or concrete, in order to avoid neutralizing any negative air ions generated. The horticultural smudging system may also include a compressed air container connected to the thermal container to allow compressed air to flow into the thermal container to improve the combustion of the combustible smudging materials burnt within. The system may also include a vented firebox positioned within the thermal container such that compressed air propelled into the thermal container passes through the vented firebox to enhance combustion of the combustible smudging materials placed on the vented firebox. One or more controllers may be used to control an oxygen sensor, air regulator connected to the compressed air container, pressure release valve, air pressure sensor, flue gas release valve, and flue gas release sensor, to (1) control the flow of air through the air regulator to increase the flow of air into the thermal container when the oxygen content measured by the oxygen sensor drops below a selected oxygen level, (2) control the opening of the pressure release valve when the air pressure measured by the air pressure sensor rises above the selected pressure level, and (3) control the opening of the flue gas release valve and activation of the flue gas flow propeller when the flue gas content measure by the flue gas release sensor rises above the selected flue gas level. Some embodiments may include a refrigerated cooling chamber to cool the gas before it is directed towards the plants.

In another embodiment, a method of horticultural smudging includes combusting materials continuously during a selected period of time so that flue gas output is directed to contact plants to increase growth and production. The method may include positioning a combustible smudging material on a vented firebox within a thermal container and producing flue gas containing negative ions by burning the combustible smudging material. To improve combustion of the combustible smudging materials, it may be necessary to measure the oxygen content of the air within the thermal container and release air into the thermal container from, e.g., a compressed air container, when the oxygen content of the air within the thermal container drops below a selected level. It may also be necessary to measure the air pressure within the thermal container and maintain that pressure within a desired range by opening and closing a pressure release valve. Additionally, the method may include measuring the flue gas content within the thermal container and opening a valve to release the flue gas only after the flue gas content rises above a selected level. Once the valve is opened, a flue gas flow propeller may be used to propel the gas through one or more flue gas distribution outlets towards one or more plants.

Other aspects and features of the present disclosure will become apparent to those of ordinary skill in the art after reading the detailed description herein and the accompanying figures.

BRIEF DESCRIPTION OF DRAWINGS

It will be appreciated that for purposes of simplicity and clarity of illustration, the elements and features illustrated in the drawings are not necessarily drawn to scale. In addition, while embodiments incorporating various features and benefits of the present disclosure are shown and described with respect to the drawings, other features and benefits will become apparent as the description proceeds when taken in conjunction with the accompanying drawings, in which.

While the disclosure is described herein in connection with reference to one or more embodiments, it will be understood that it is not intended to limit the disclosure to such embodiments. On the contrary, the present disclosure is intended to cover all alternatives, modifications, and equivalents, as may be included within the spirit and scope of the disclosure as defined by the appended claims.

DETAILED DESCRIPTION

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

One or more embodiments of systems, machines, apparatuses, and methods for horticultural smudging for improving the growth and production of plants are disclosed herein.

Figure 1A:
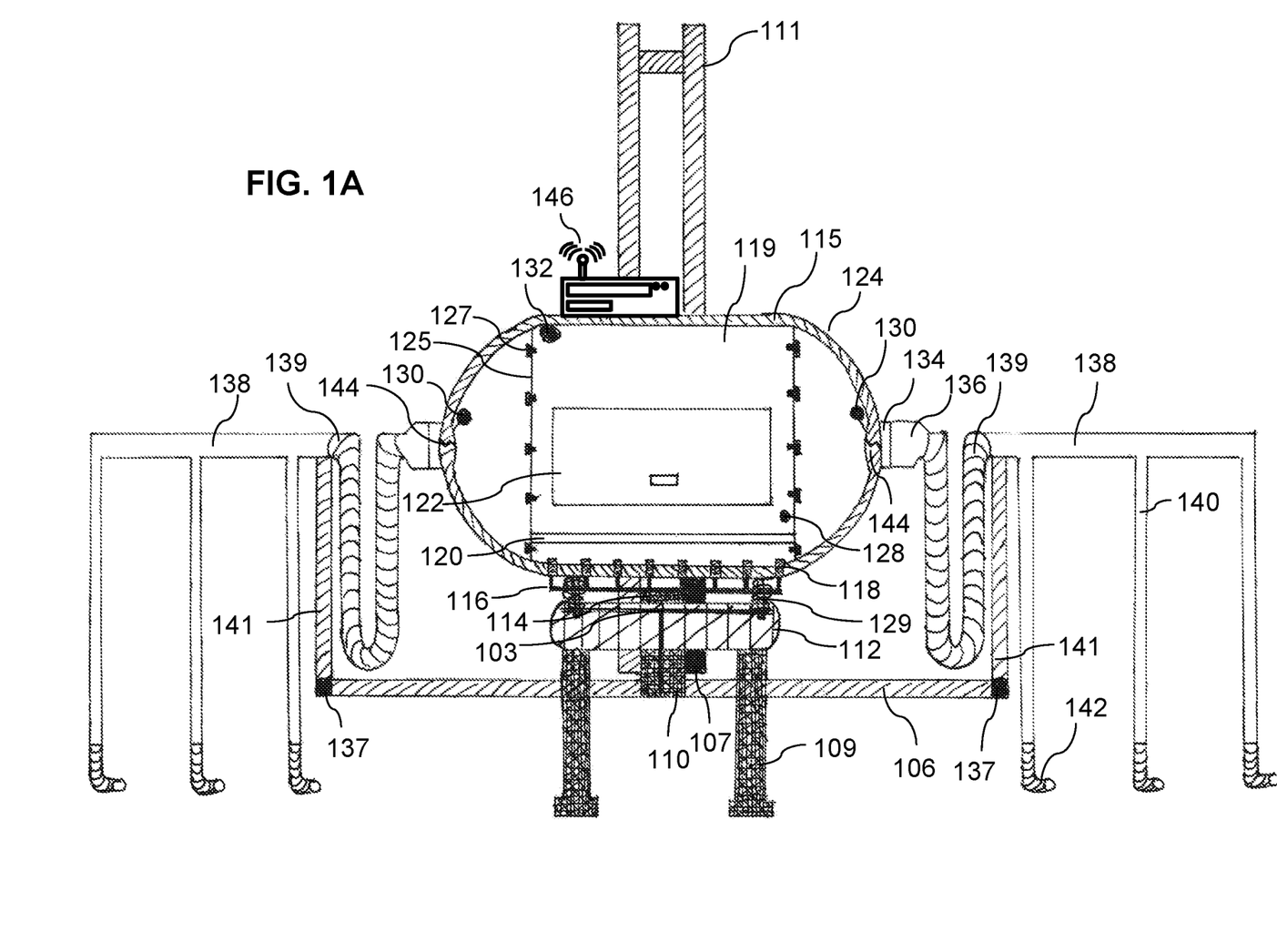
FIG. 1A is a front view of a horticultural smudging system according to an embodiment of the present disclosure.

FIG. 1A is a front view of a horticultural smudging system according to an embodiment of the present disclosure. One embodiment includes a thermal container 119 for the burning of combustible smudging materials in order to generate flue gas containing negative air ions and carbon dioxide. In some embodiments the thermal container is constructed from non-conductive materials, such as stone or concrete, in order to avoid neutralizing the negative air ions. In one embodiment; a masonry container may be used as the thermal container 119. The thermal container 119 may include a thermal padding layer 115 and an exterior shell 124 to contain the combustion therein. In an embodiment, the combustible smudging materials may be placed on a removable vented firebox base 120 disposed within the thermal container 119 in order to improve combustion. The removable vented firebox base 120 may be accessible through a sealed and insulated access door 122 positioned on the wall of the thermal container 119. In some embodiments, the vented firebox base 120 is contained within the base of the thermal container 119 and extrudes through the exterior shell 124. The thermal container 119 may also include a service entry 125 attached to the thermal container 119 by one or more nut and bolt assemblies 127. In some embodiments the nut and bolt assemblies may also be used to secure the thermal container 119, thermal padding layer 115, and exterior shell 124. The thermal container 119 may be connected to a horizontal support bar 106 and one or more legs 109 capable of supporting the thermal container 119. The thermal container may also be connected to a suspension base bar 103 and suspension system 129 in order to improve stability and transportability of the thermal container 119.

In an embodiment, the thermal container 119 includes one or more air inlets 118 which allow air from outside the thermal container to enter the thermal container. In some embodiments, as compressed air container 112 is connected to the air inlets 118 through an inlet supply pipe 116. In one embodiment, the compressed air container 112 may connect to the inlet supply pipe using a flexible threaded connecting pipe 114. In some embodiments, the compressed air container 112 may be centrally mounted to a suspension base bar 103. Additionally, an oxygen sensor 128 may be connected to the inside of the thermal container 119 to measure the oxygen levels within the container. When the oxygen within the thermal container 119 falls below a selected minimum level, then air from the compressed air container 112 is released into the thermal container 119 to improve combustion. The desired minimum oxygen level may be selected based on the specific combustible smudging material selected. In some embodiments, it may be desirable to select a minimum oxygen level that is up to 30 percent below the oxygen concentration of the air outside the thermal container in order to ensure that the oxygen level within the thermal container does not fall below the minimum level necessary to support combustion for the combustible smudging material selected. In other embodiments, it may be desirable to select a minimum oxygen level that is equal to or greater than the oxygen concentration in the air outside the thermal container in order to increase the rate of combustion within the thermal container. In some embodiments, the compressed air container 112 may include a regulator in order to regulate the amount of air released from the compressed air container 112 into the thermal container 119. In other embodiments, propellers that propel oxygen into the thermal container through the air inlets may be used to regulate the amount of air introduced into the thermal container. When compressed air (or another source of pressurized air) is introduced into the thermal container, it may be necessary to monitor air pressure within the container to ensure that conditions remain conducive to horticultural smudging, and to ensure that overpressure does not run the risk of rupturing the thermal container. In an embodiment, an air pressure sensor 132 is positioned within the thermal container 119 to measure the air pressure within the container. The thermal container may include an air pressure release valve 143 which can be opened to release pressure within the thermal container if the air pressure measured by the air pressure sensor 132 rises above a selected maximum pressure. In one embodiment, the maximum air pressure is selected based on the maximum rated air pressure of the thermal container. In another embodiment, the maximum air pressure will be selected based on the desired flue gas output rate for the plants being treated.

In an embodiment, one or more flue gas release valves 144 are connected to the thermal container 119 in order to allow the flue gas generating from burning the combustible smudging materials to be distributed towards one or more plants. One or more flue gas distribution outlets 140 may be connected to the flue gas release valves 144 in order to facilitate effective distribution of the flue gas. In order to utilize multiple flue gas distribution outlets 140, it may be necessary to connect multiple flue gas distribution pipes to a horizontal flue gas supply pipe 138 which is connected to one or more flue gas release valves 144. In one embodiment, a hydraulic elevator may be used to raise and lower the flue gas distribution outlets 140 in order to position them to distribute flue gas onto the desired portions of one or more plants. The flue gas distribution outlets 140 may be connected to a hydraulic system 104, hydraulic elevator 137, and hydraulic elevator frame 111 using a peripheral arm 141 and a horizontal support bar 106. In one embodiment, the horizontal support bar 106 may be centrally mounted onto the hydraulic elevator frame 111, and a suspension base bar 103 may be centrally mounted onto the horizontal support bar 106 by way of a T shaped extension. In another embodiment, a power source and control panel 110 may be used to power and control the hydraulic system 104. The power source and control panel 110 may be located adjacent to the hitch system 104 and above the horizontal support bar 106, and the hydraulic system 107 may be rear mounted to the right side base of the hydraulic elevator frame 111. In some embodiments, this power source 110 may also be used to supply power to the hydraulic system 107, the air regulator 145, the flue gas release sensor 130 and valve 144, the air pressure sensor 132 and air pressure release valve 143, and one or more peripheral hydraulic elevators 137. In order to allow for the movement of the hydraulic elevator relative to the thermal container 119, it may be necessary to connect the flue gas distribution outlets 140 to the thermal container 119 using one or more flexible flue gas supply pipes 139. The direction of flue gas distribution can be further refined by using one or more flexible flue gas dispersion pipes 142 connected to the one or more flue gas distribution outlets 140.

In some situations, it may be beneficial to build up the concentration of flue gas containing negative ions within the thermal container 119 before distributing the flue gas for contact with plants. In an embodiment, one or more flue gas sensors 130 are positioned within the thermal container 119 to measure the concentration of flue gas within the container. In some embodiments, the flue gas sensor may measure the level of negative ions in the air, such as with a Gerdien Condenser. In other embodiments, the flue gas sensor may measure the amount of particulate matter in the air. In still other embodiments, the flue gas sensor may measure the flue gas pressure within the thermal container. When the concentration of flue gas within the container is below a selected level, the flue gas release valves 144 are closed to allow the concentration of flue gas to build up. Once the concentration of flue gas as measured by the flue gas sensors 130 increases above the selected level, the flue gas release valves 144 are opened to release the flue gas to be directed towards one or more plants.

In an embodiment, one or more controllers 146 are used to control operation of the horticultural smudging system. The controllers 146 may include one or more processors and one or more programs stored in memory that communicate with the processors, and may be connected by either wired or wireless communication means to other equipment, as will be understood by those of skill in the art.

Figure 1B:
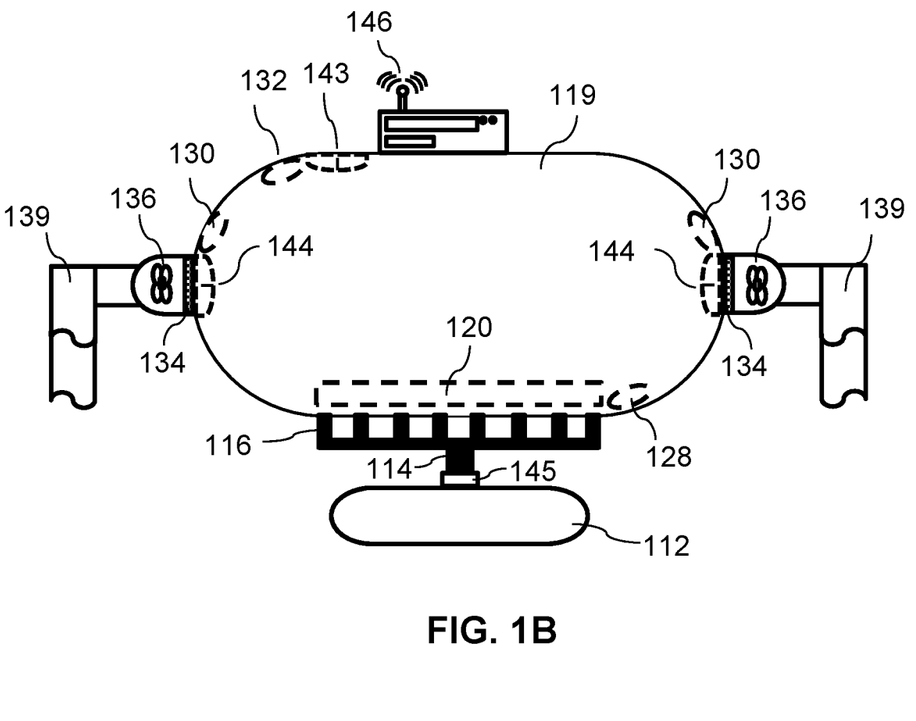
FIG. 1B is a cutaway view of a portion of the horticultural smudging system according to an embodiment of the present disclosure.
Figure 1C:
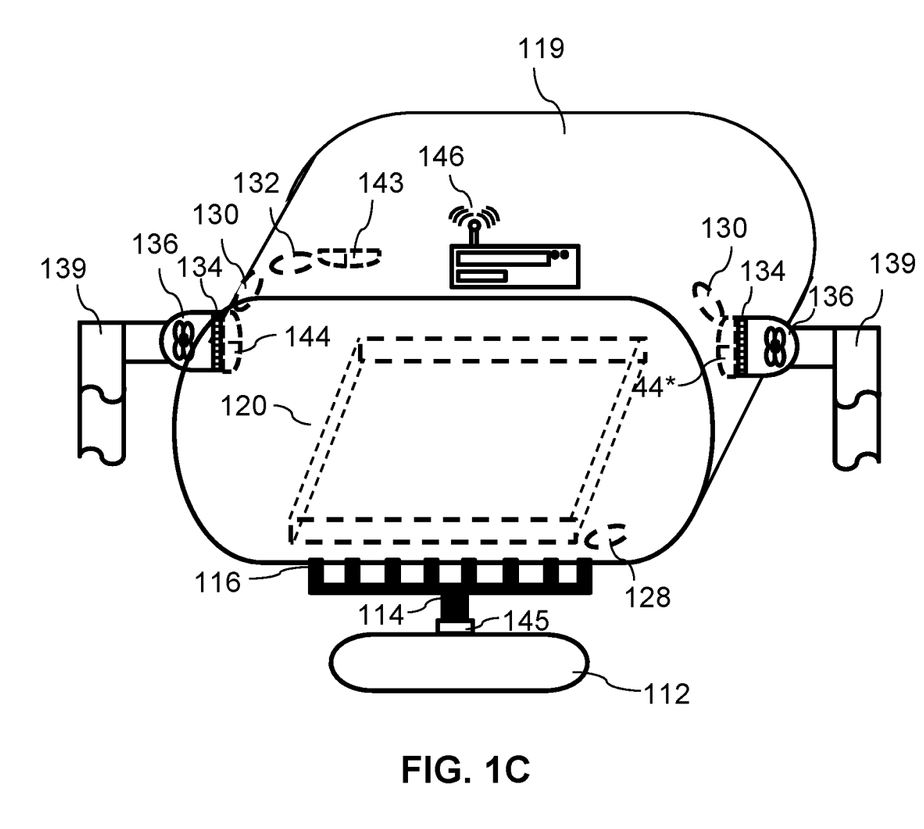
FIG. 1C is a cutaway perspective view of a portion of the horticultural smudging system according to an embodiment of the present disclosure.

FIG. 1B is a cutaway view of a portion of the horticultural smudging system according to an embodiment of the present disclosure, and FIG. 1C is a cutaway perspective view of a portion of the horticultural smudging system according to an embodiment of the present disclosure. One embodiment includes a thermal container 119 for the burning of combustible smudging materials in order to generate flue gas containing negative air ions. Combustible smudging materials may be placed on a removable vented firebox base 120 disposed within the thermal container 119 in order to improve combustion. In some embodiments, a compressed air container 112 is connected to the thermal container 119 through an inlet supply pipe 116. In one embodiment, the compressed air container 112 may connect to the inlet supply pipe using a flexible threaded connecting pipe 114. In some embodiments, an oxygen sensor 128 is connected to the inside of the thermal container 119 to measure the oxygen levels within the container When the oxygen within the thermal container 119 fall below a selected minimum level, then air from the compressed air container 112 is released into the thermal container 119 to improve combustion. In some embodiments, the compressed air container 112 may include a regulator 145 in order to regulate the amount of air released from the compressed air container 112 into the thermal container 119. When compressed air (or another source of pressurized air) is introduced into the thermal container, it may be necessary to monitor air pressure within the container to ensure that conditions remain conducive to horticultural smudging, and to ensure that overpressure does not run the risk of rupturing the thermal container 119. In an embodiment, an air pressure sensor 132 is positioned within the thermal container 119 to measure the air pressure within the container. The thermal container may include an air pressure release valve 143 which can be opened to release pressure within the thermal container if the air pressure measured by the air pressure sensor 132 rises above a selected maximum pressure.

In an embodiment, one or more flue gas release valves 144 are connected to the thermal container 119 in order to allow the flue gas generating from burning the combustible smudging materials to be distributed towards one or more plants. One or more flexible flue gas supply pipes 139 may be connected to the flue gas release valves 144 in order to facilitate effective distribution of the flue gas. In order to assist with propulsion of the flue gas, the embodiment may include one or more flue gas propellers 136 which propel flue gas within the thermal container through the one or more flue gas valves 144 towards one or more plants. In some embodiments, the flue gas propeller 136 may be a fan, pump, or other means of propelling flue gas as will be understood by a person of skill in the art. A removable spark filter 134 may be place between the thermal container 119 and the flue gas propeller 136 to prevent combustible materials from escaping the thermal container 119 and damaging downstream components of the horticultural smudging system.

In some situations, it may be beneficial to build up the concentration of flue gas containing negative ions within the thermal container 119 before distributing the flue gas for contact with plants. In an embodiment, one or more flue gas sensors 130 are positioned within the thermal container 119 to measure the concentration of flue gas within the container. When the concentration of flue gas within the container is below a selected level, the flue gas release valves 144 are closed to allow the concentration of flue gas to build up. Once the concentration of flue gas as measured by the flue gas sensors 130 increases above the selected level, the flue gas release valves 144 are opened to release the flue gas to be directed towards one or more plants.

In an embodiment, one or more controllers 146 are used to control operation of the horticultural smudging system. The controllers 146 may include one or more processors and one or more programs stored in memory that communicate with the processors, and may be connected by either wired or wireless communication means to other equipment, as will be understood by those of skill in the art. The one or more controllers 146 may be placed in communication with the oxygen sensor 128, the air regulator 145, the pressure release valve 143, the air pressure sensor 132, the flue gas release valve 144, and the flue gas release sensor 130, to (1) control the flow of air through the air regulator 145 to increase the flow of air into the thermal container 119 when the oxygen content measured by the oxygen sensor 128 drops below a selected oxygen level, (2) control the opening of the pressure release valve 143 when the air pressure measured by the air pressure sensor 132 rises above the selected pressure level, and (3) control the opening of the flue gas release valve 144 and activation of the flue gas flow propeller 136 when the flue gas content measure by the flue gas release sensor 130 rises above the selected flue gas level.

Figure 1D:
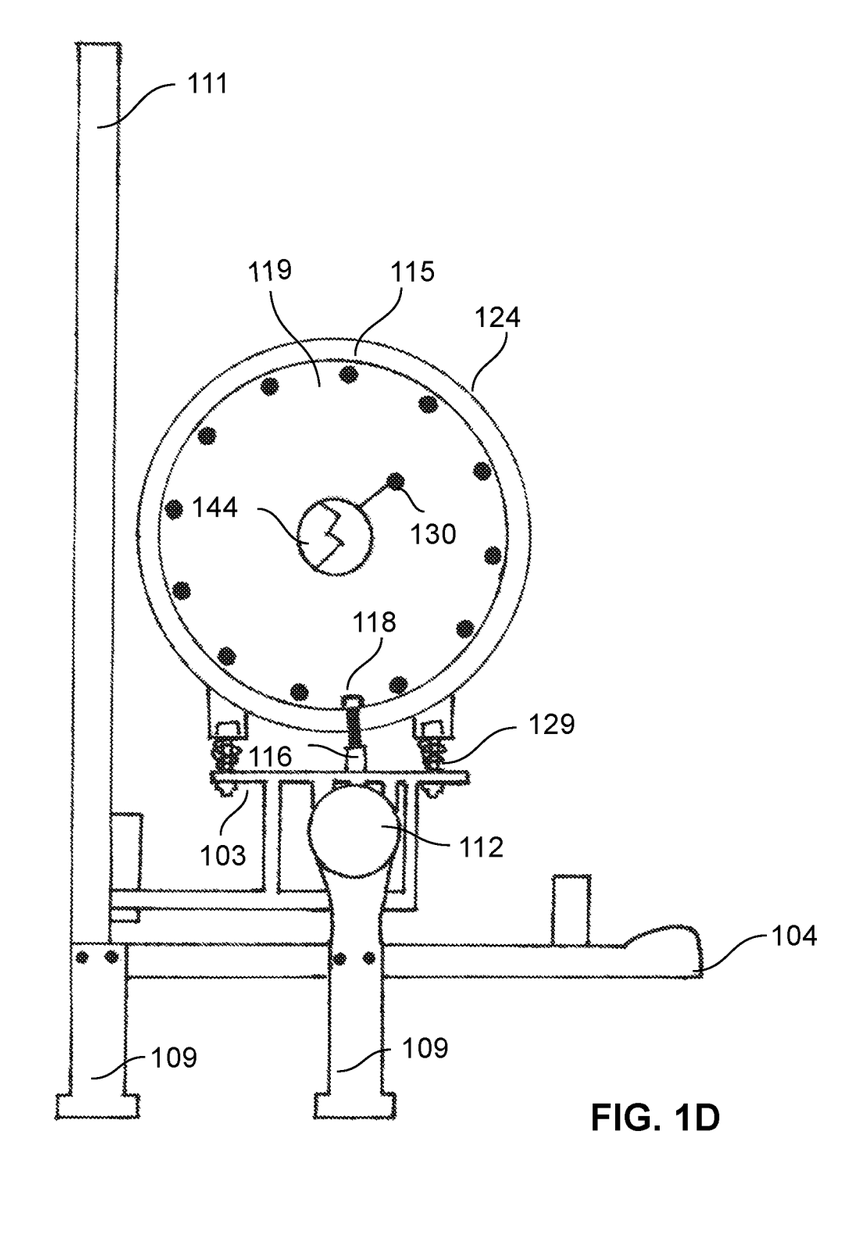
FIG. 1D is a side view of a horticultural smudging system according to an embodiment of the present disclosure.

FIG. 1D is a side view of a horticultural smudging system according to an embodiment of the present disclosure. One embodiment includes a thermal container 119 for the burning of combustible smudging materials in order to generate flue gas containing negative air ions. The thermal container 119 may include a thermal padding layer 115 and an exterior shell 124 to contain the combustion therein. The thermal container 119 may be connected to one or more legs 109 capable of supporting the thermal container 119. The thermal container 119 may also be connected to a suspension base bar 103 and suspension system 129 in order to improve stability and transportability of the thermal container 119.

In an embodiment, the thermal container 119 includes one or more air inlets 118 which allow air from outside the thermal container to enter the thermal container. In one embodiment, the air inlets 118 may be integrated into the base of the thermal container 119. In some embodiments, compressed air container 112 is connected to the air inlets 118 through an inlet supply pipe 116. One or more flue gas sensors 130 may be positioned within the thermal container 119 to measure the concentration of flue gas within the container. When the concentration of flue gas within the container is below a selected level, the flue gas release valves 144 are closed to allow the concentration of flue gas to build up. Once the concentration of flue gas as measured by the flue gas sensors 130 increases above the selected level, the flue gas release valves 144 are opened to release the flue gas to be directed towards one or more plants.

The horticultural smudging system may include a hydraulic system 104 and hydraulic elevator frame 111 allowing all or part of the horticultural smudging system to be elevated to target specific portions of plants.

In some embodiments, the horticultural smudging system is a mobile horticultural smudging system capable of being operated while towed by a vehicle. In one embodiment, the horticultural smudging system includes a tow hitch system 104 to allow it to be connected to a vehicle. The tow hitch system 104 may be mounted onto the hydraulic elevator 111 in order to connect the system to the transporting vehicle. When not in operation, the horticultural smudging system may be stabilized by the legs 109 and 109 which are attached to the horizontal support bar 106. The legs 109 may be raised to allow the horticultural smudging system to be towed to a new location. Because the one or more plants receiving flue gas from the horticultural smudging system may be spread over a large area, in some embodiments the horticultural smudging system operates continuously while being towed to produce flue gas containing negative air ions and direct the flue gas towards the plants. In some embodiments, the horticultural smudging system may include an engine or other form of self-propulsion enabling it to propel itself during operation. In other embodiments, the system may be manually pulled or pushed by the operator during operation. In still other embodiments, the horticultural smudging system may be integrated into a stationary operation, such as a greenhouse, with the flue gas being routed through one or more stationary flue gas outlets to direct the flue gas to the plant locations within the stationary operation.

Figure 1E:
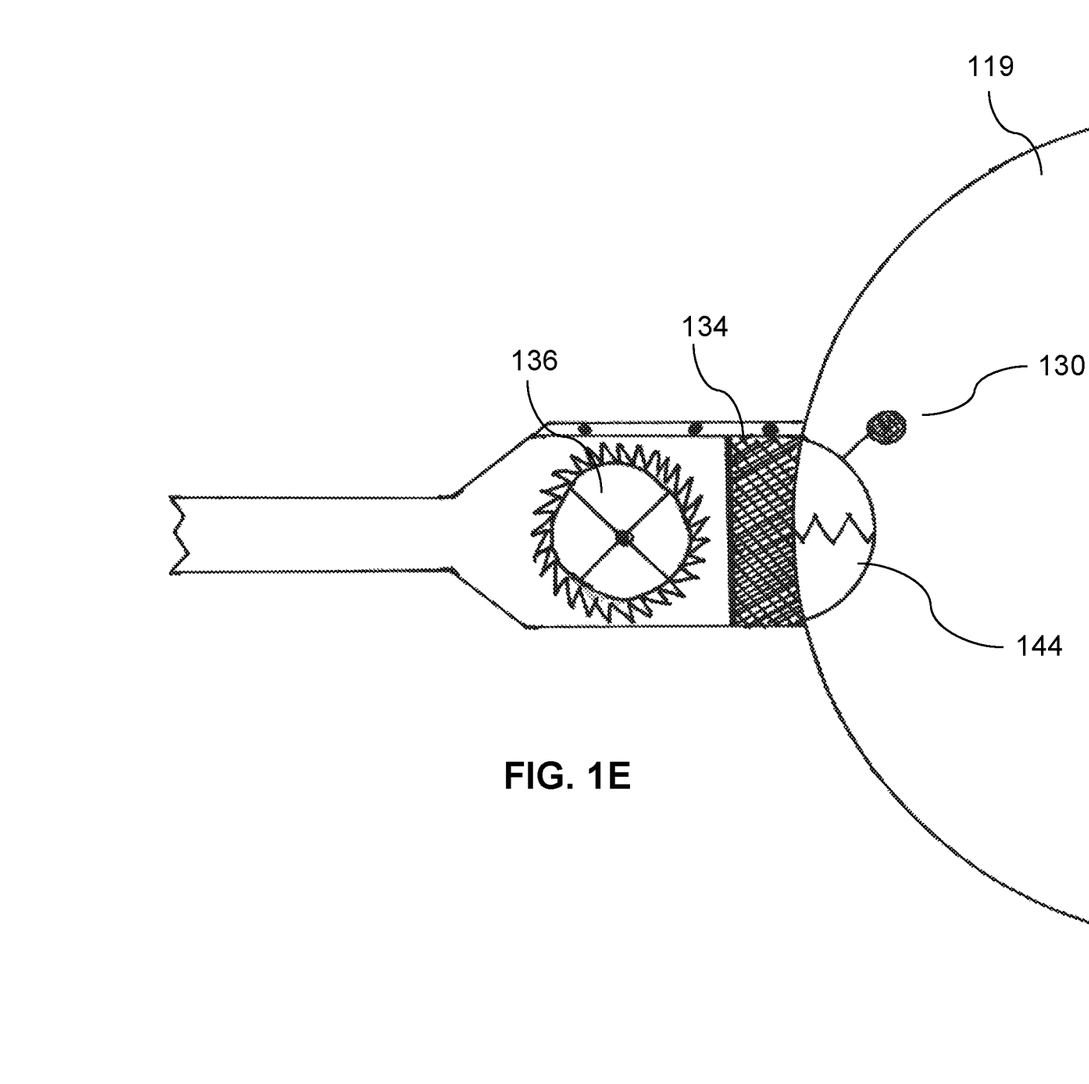
FIG. 1E is a partial view of a horticultural smudging system including a thermal container, a flue gas distribution outlet, flue gas flow propeller, and flue gas release valve, according to an embodiment of the present disclosure.

FIG. 1E is a partial view of a horticultural smudging system, according to an embodiment of the present disclosure. One embodiment includes a thermal container 119 for the burning of combustible smudging materials in order to generate flue gas containing negative air ions. In an embodiment, one or more flue gas release valves 144 are connected to the thermal container 119 in order to allow the flue gas generating from burning the combustible smudging materials to be distributed towards one or more plants. In order to assist with propulsion of the flue gas, the embodiment may include one or more flue gas propellers 136 which propel flue gas within the thermal container through the one or more flue gas valves 144 towards one or more plants. A removable spark filter 134 may be place between the thermal container 119 and the flue gas propeller 136 to prevent combustible materials from escaping the thermal container 119 and damaging downstream components of the horticultural smudging system. In an embodiment, one or more flue gas sensors 130 are positioned within the thermal container 119 to measure the concentration of flue gas within the container. When the concentration of flue gas within the container is below a selected level, the flue gas release valves 144 are closed to allow the concentration of flue gas to build up. Once the concentration of flue gas as measured by the flue gas sensors 130 increases above the selected level, the flue gas release valves 144 are opened to release the flue gas to be directed towards one or more plants.

Figure 1F:
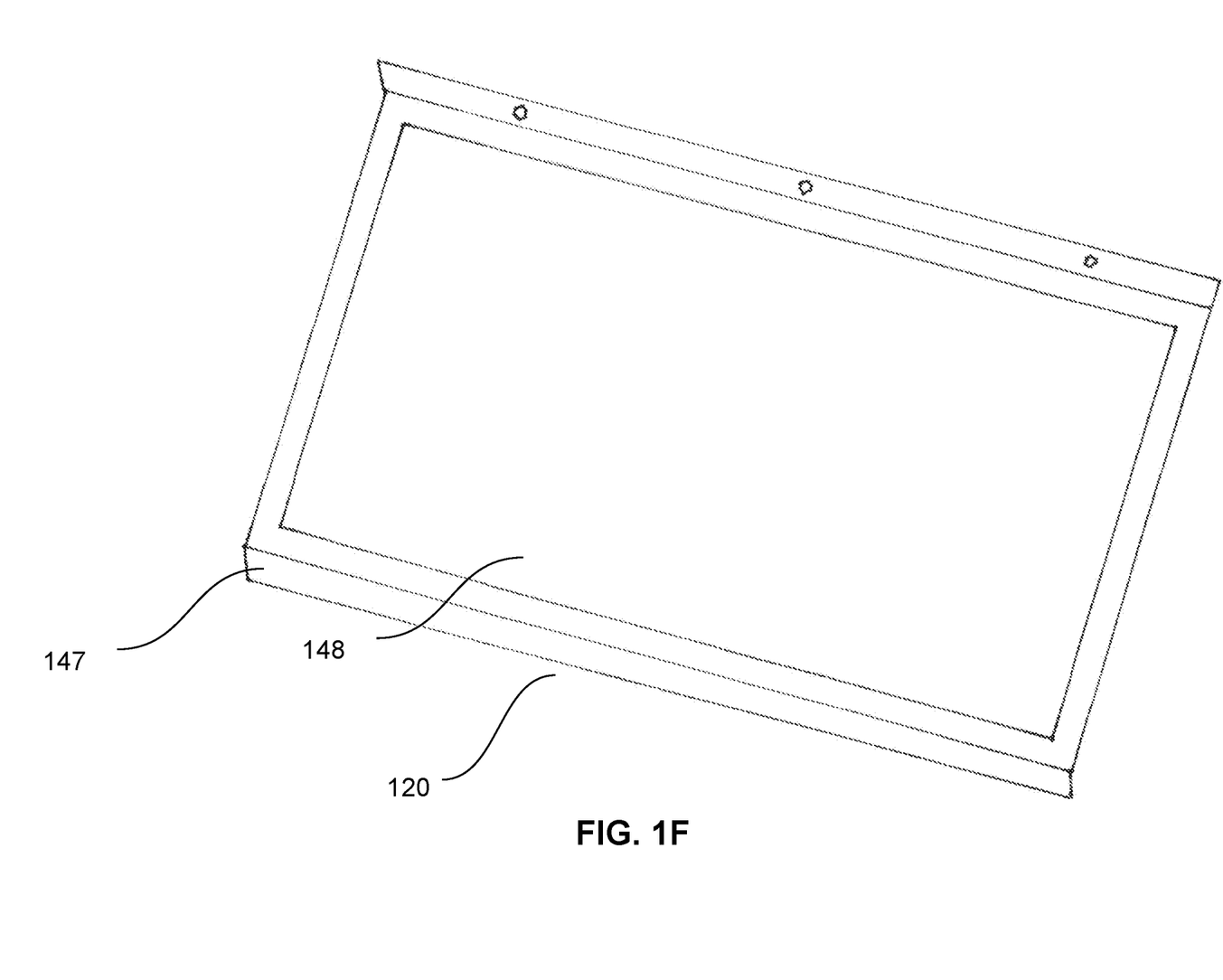
FIG. 1F is a perspective view of a removable vented firebox base of a horticultural smudging system, according to an embodiment of the present disclosure.

FIG. 1F is a perspective view of a removable vented firebox base 120 of a horticultural smudging system, according to an embodiment of the present disclosure. Combustible smudging materials may be placed on the removable vented firebox base 120 in order to improve combustion of materials. The removable vented firebox base 120 may include a heat and flame tolerant frame 147 and screen 148. The screen 148 may be made of a metal wire mesh, or other material sufficient to support a combustible smudging material while still allowing improved air flow from underneath, as will be understood by a person of skill in the art.

In one embodiment, a horticultural smudging system to combust materials continuously during a selected period of time so that flue gas output therefrom passes to contact plants thereby to enhance plant growth and production includes a thermal container 119 to burn combustible smudging materials when disposed within the thermal container 119 to generate flue gas containing negative ions, the thermal container 119 including one or more walls being comprised at least partially of a non-conductive material. The system may include one or more air inlets 118 connected to the thermal container 119 and positioned to allow air from outside the thermal container to enter the thermal container, and a compressed air container 112 connected to the thermal container 119 and positioned in fluid communication with the one or more air inlets 118, thereby to allow compressed air to flow into the thermal container 119 through the one or more air inlets 118. An air regulator 145 may be connected to the compressed air container 112 and positioned in fluid communication with the compressed air container 112, the thermal container 119, and the one or more air inlets 118, thereby to regulate the flow of air from the compressed air container 112 into the thermal container 119 through the one or more air inlets 118. In some embodiments, an oxygen sensor 128 is connected to the thermal container 119 and positioned to measure oxygen content within the thermal container 119 during operation thereof to control the flow of air through the air regulator 145 responsive to the oxygen sensor 128 when the oxygen content measured by the oxygen sensor 128 drops below a selected oxygen level, thereby to enhance combustion of the combustible smudging materials. In some embodiments, a pressure release valve 143 may be connected to the thermal container 119 and positioned to allow air and flue gas to escape the thermal container 119 when the pressure release valve is in an open position, and an air pressure sensor 132 may be connected to the thermal container 119 and positioned to measure the air pressure within the thermal container 119 thereby selectively to open the pressure release valve 143 to allow air to escape when the air pressure within the thermal container 119 rises above a selected pressure level. The system may include a vented firebox 120, on which to dispose the combustible smudging materials, positioned within the thermal container 119 adjacent to the air inlets 118, such that compressed air propelled into the thermal container 119 through the air inlets 118 passes through the vented firebox 120 thereby to enhance combustion of the combustible smudging materials when disposed thereon. In some embodiments, one or more flue gas distribution outlets 140 may be connected to the thermal container 119 and positioned to emit flue gas from the distal end thereof to be directed toward one or more plants for contact therewith. A flue gas flow propeller 136 may be positioned to propel flow of flue gas from the thermal container 119 through one or more of the flue gas distribution outlets 140 during operation thereof, a flue gas release valve 144 may be positioned to allow the flue gas to pass through one or more of the flue gas distribution outlets 140 when the flue gas release valve 144 is in an open position, and a flue gas release sensor 130 may be positioned to measure the flue gas levels present in at least a portion of the thermal container 119 thereby selectively to open the flue gas release valve 144 to allow flue gas to pass into the flue gas distribution outlet 140 to be directed toward one or more plants for contact therewith so that the flue gas enhances the growth and production of the plants through contact therewith when the flue gas level within the thermal container 119 rises above a selected flue gas level. Additionally, one or more controllers 146 in communication with the oxygen sensor 128, the air regulator 145, the pressure release valve 143, the air pressure sensor 132, the flue gas release valve 144, and the flue gas release sensor 130 may (1) control the flow of air through the air regulator 145 to increase the flow of air into the thermal container 119 when the oxygen content measured by the oxygen sensor 128 drops below a selected oxygen level, (2) control the opening of the pressure release valve 143 when the air pressure measured by the air pressure sensor 132 rises above the selected pressure level, and (3) control the opening of the flue gas release valve 144 and activation of the flue gas flow propeller 136 when the flue gas content measure by the flue gas release sensor 130 rises above the selected flue gas level.

Some embodiments may include one or more flexible flue gas dispersion pipes 139 attached to the distal end of one or more of the flue gas distribution outlets 140 and capable of being oriented to direct the flue gas emitted from the flue gas distribution outlets 140 towards one or more plants, one or more hydraulic elevators 111 connected to one or more of the flexible flue gas dispersion pipes 139 and the flue gas distribution outlets 140, and a hydraulic controller 110 in communication with one or more of the hydraulic elevators 11 to control raising one or more of the hydraulic elevators 111 to a height sufficient to disperse flue gas onto a targeted portion of one or more plants.

In some embodiments, the non-conductive material included in the one or more walls of the thermal container 119 is positioned to reduce contact between the flue gas and any conductive portions of the thermal container 119, thereby reducing neutralization of negative ions in the flue gas produced when burning combustible smudging materials disposed within the thermal container 119. In some embodiments, the non-conductive material may be stone.

In another embodiment, a horticultural smudging system to combust materials continuously during a selected period of time so that flue gas output therefrom passes to contact plants thereby to enhance plant growth and production includes a thermal container 119 to burn combustible smudging materials when disposed within the thermal container 119 to generate flue gas containing negative ions, the thermal container 119 including one or more walls being comprised at least partially of a non-conductive material. The embodiment may also include an air regulator 145 connected to the thermal container 119 and positioned to regulate the flow of air into the thermal container 119, an oxygen sensor 128 connected to the thermal container 119 and positioned to measure oxygen content within the thermal container 119 during operation thereof to control the flow of air through the air regulator 145 responsive to the oxygen sensor 128 when the oxygen content measured by the oxygen sensor 128 drops below a selected oxygen level, thereby to enhance combustion of the combustible smudging materials. The system may further include a flue gas release valve 144 positioned to allow the flue gas to pass through one or more of the flue gas distribution outlets 140 when the flue gas release valve 144 is in an open position, and a flue gas release sensor 130 positioned to measure the flue gas levels present in at least a portion of the thermal container 119 thereby selectively to open the flue gas release valve 144 to allow flue gas to escape the thermal container 119 and be directed toward one or more plants for contact therewith so that the flue gas enhances the growth and production of the plants through contact therewith when the flue gas level within the thermal container 119 rises above a selected flue gas level. In some embodiments, one or more controllers may be placed in communication with the oxygen sensor 128, the air regulator 145, the flue gas release valve 144, and the flue gas release sensor 130, to (1) control the flow of air through the air regulator 145 to increase the flow of air into the thermal container 119 when the oxygen content measured by the oxygen sensor 128 drops below a selected oxygen level, and (2) control the opening of the flue gas release valve 144 when the flue gas content measure by the flue gas release sensor 130 rises above the selected flue gas level.

In some embodiments, one or more flexible flue gas dispersion pipes 139 may be connected to the thermal container 119 and capable of being oriented to direct the flue gas emitted from the thermal container 119 towards one or more plants. Additionally, one or more hydraulic elevators 111 may be connected to one or more of the flexible flue gas dispersion pipes 119 and the flue gas distribution outlets 140, and a hydraulic controller 110 may be placed in communication with one or more of the hydraulic elevators 111 to control raising one or more of the hydraulic elevators 111 to a height sufficient to disperse flue gas onto a targeted portion of one or more plants.

Some embodiments may include a vented firebox 120, on which to dispose the combustible smudging materials, positioned within the thermal container 119, such that air entering the thermal container 119 passes through the vented firebox 120 thereby to enhance combustion of the combustible smudging materials when disposed thereon.

Figure 2:
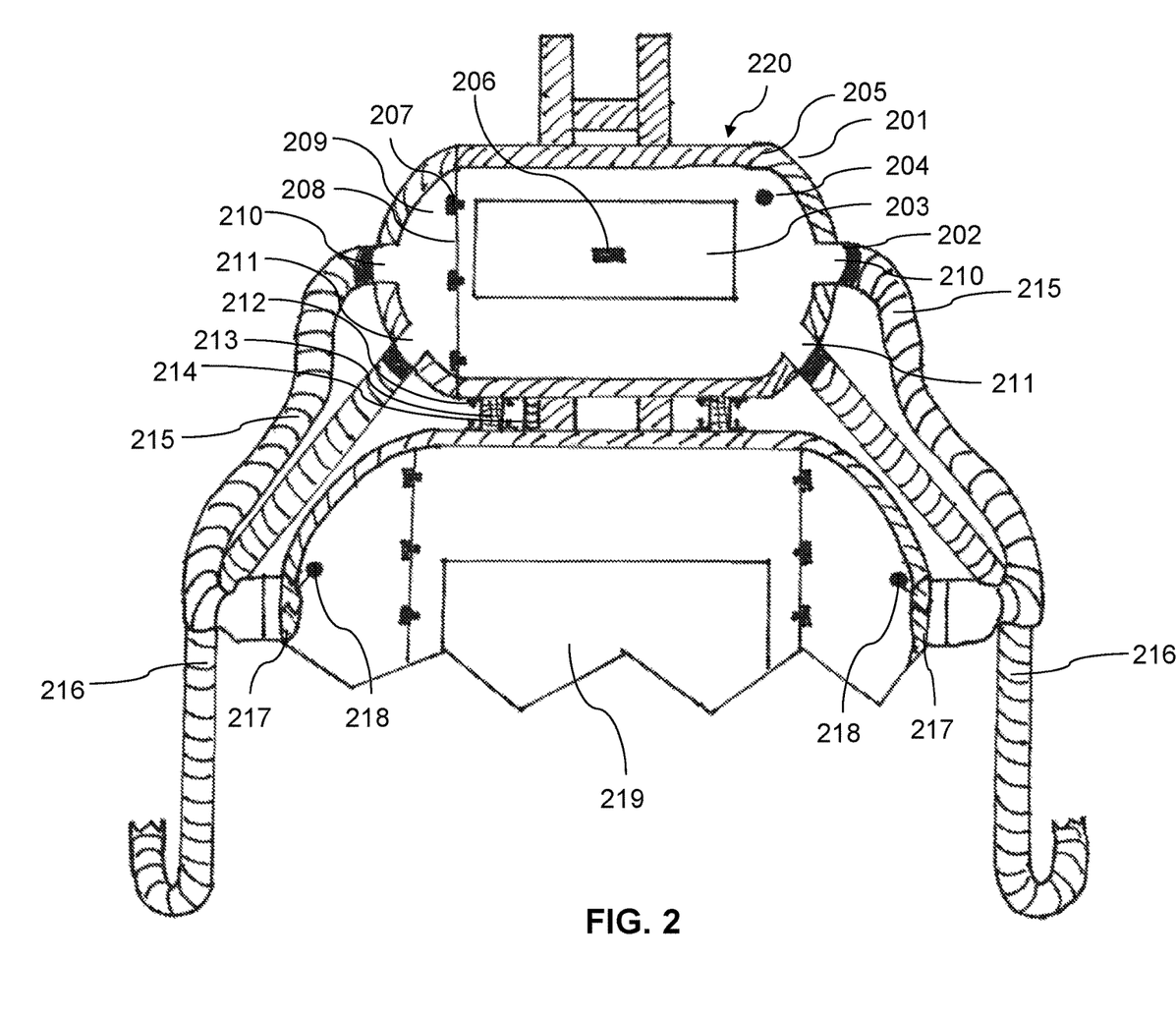
FIG. 2 is a partial view of a horticultural smudging system including a cooling chamber, according to an embodiment of the present disclosure.

FIG. 2 is a partial view of a horticultural smudging system including a cooling chamber 220, according to an embodiment of the present disclosure. The flue gas containing negative ions produced when combustible smudging materials are burnt within a combustion chamber 219 will generally be substantially hotter than the ambient air outside of the thermal container. Because some plants are sensitive to hot temperatures, directing the flue gas towards the plants may have a deleterious effect on the health of the plants if the flue gas is substantially hotter than the ambient air. Therefore, in some embodiments it may be desirable to use a cooling chamber 220 to cool down the temperature of the flue gas before it is directed towards one or more plants. The desired temperature will depend on the plants being treated, as well as the ambient temperature of the air outside the thermal container, as will be understood by one of skill in the art. In some embodiments, it may be desirable to cool the flue gas to at least 45° C. prior to directing the flue gas towards the one or more plants to prevent the temperature from negatively affecting the plants. In other embodiments, temperatures between 20° C. and 90° C. may be desirable.

A cooling chamber 220 embodiment may include a thermal container 219 for the burning of combustible smudging materials in order to generate flue gas containing negative air ions. In an embodiment, one or more flue gas release valves 217 are connected to the thermal container 219 in order to allow the flue gas generating from burning the combustible smudging materials to be distributed towards one or more plants. One or more flue gas sensors 218 may be positioned within the thermal container 219 to measure the concentration of flue gas within the container. When the concentration of flue gas within the container is below a selected level, the flue gas release valves 217 are closed to allow the concentration of flue gas to build up. Once the concentration of flue gas as measured by the flue gas sensors 218 increases above the selected level, the flue gas release valves 217 are opened to release the flue gas to be cooled before being directed towards one or more plants.

Flue gas released from the thermal container 219 through the flue gas release valves 217 may travel through one or more flue gas inlet hoses 215 to the cooling chamber 220. The flue gas inlet hoses may be attached to one or more flue gas inlets 210 on the cooling chamber 220 by the use of one or more hose connectors 202. The cooling chamber 220 may include an outer shell 201 and insulation layer 205 to help regulate the internal temperature within the cooling chamber 220. The cooling chamber 220 may also include an access door handle 206 connected to an access door 203 to allow access for inspection and maintenance of the internal components of the cooling chamber 220. The cooling chamber may also include an inner shell access 208 attached to the cooling chamber 220 by a bolt and nut assembly 207. Flue gas may remain in the cooling chamber 220 until its temperature has decreased to a point where it is no longer damaging to plants, before being directed through one or more flue gas outlets 211 through flue gas outlet hoses 216 towards the one or more plants.

In some embodiments, a passively cooled cooling chamber 220 may not sufficiently reduce the temperature of the flue gas to avoid damage to the one or more plants coming into contact with the flue gas. Therefore, in some situations it may be desirable to use active cooling, such as a refrigeration unit, to reduce the temperature within the cooling chamber 220. A refrigeration unit may include an inner shell 209 connected to the cooling chamber 220 to reduce the temperature therein. The refrigeration unit may also include a container bracket 213, wiring and hosing 214, and be connected by a bolt and nut assembly 212. The refrigeration unit may be in communication with a thermostat 204 positioned within the cooling chamber 220 to measure the temperature therein and activate the refrigeration unit when necessary to decrease the temperature therein Other configurations and methods of cooling are also available to actively cool the flue gas within the cooling chamber, as will be understood by a person of skill in the art.

In some embodiments, a horticultural smudging system includes a cooling chamber 220 positioned in fluid communication with the thermal container 219 and the flue gas distribution outlets 216, thereby allowing the flue gas produced when burning combustible smudging materials disposed within the thermal container to cool before being directed toward one or more plants for contact therewith.

Figure 3:
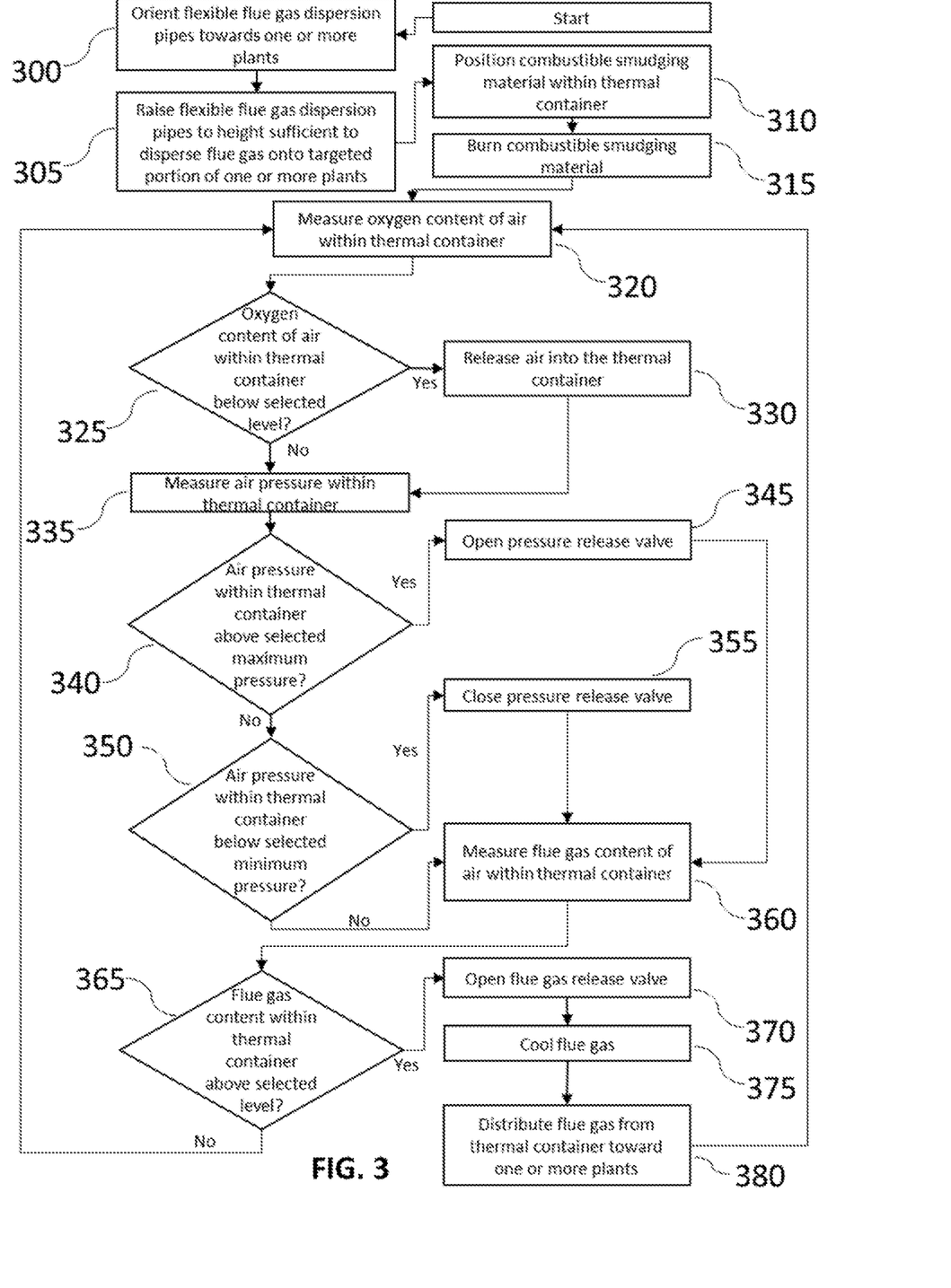
FIG. 3 is a flow diagram illustrating an embodiment of a method of horticultural smudging according to an embodiment of the present disclosure.

FIG. 3 is a flow diagram illustrating an embodiment of a method of horticultural smudging according to an embodiment of the present disclosure. One or more flexible flue gas dispersion pipes may be oriented towards one or more plants 300 such that flue gas created during horticultural smudging is directed towards the plants after exiting the flexible flue gas dispersion pipes. The flexible flue gas dispersion pipes may be raised to a height sufficient to disperse the flue gas onto targeted portions of the one or more plants 305. This may be accomplished using a hydraulic elevator, or through other methods known to a person of skill in the art. Combustible smudging material may then be placed within a thermal container 310 and burnt 315 to produce flue gas containing negative ions and carbon dioxide. The oxygen content of the air within the thermal container may then be measured 320. If the measured oxygen content is below a selected level 325 then air is released into the thermal container 330. The air pressure within the thermal container is then measured 335. If the measured air pressure is above a selected maximum pressure 340 then a pressure release valve connected to the thermal co tame s opened 345. If the air pressure is below a selected minimum pressure 350 then the pressure release valve connected to the thermal container is closed 355. The content of flue gas within the thermal container is measured 360, and if it is above a selected level 365 a flue gas release valve connected to the thermal container is opened 370. In some embodiments the flue gas exiting the thermal container through the flue gas release valve may be cooled 375 before being distributed onto one or more plants. The preceding steps may then be repeated until the combustible smudging material is exhausted.

In one embodiment, a method of combusting materials continuously during a selected period of time so that flue gas output therefrom passes to contact plants for the purposes of horticultural smudging thereby to enhance plant growth and production includes positioning a combustible smudging material on a vented firebox within a thermal container 310 including one or more walls being comprised at least partially of a non-conductive material and burning the combustible smudging material 315, thereby producing flue gas containing negative ions. The method may further include measuring, by use of an oxygen sensor, the oxygen content of the air within the thermal container 320 during operation thereof and releasing, when the oxygen content of the air within the thermal container drops below a selected level 325, air from a compressed air container into the thermal container 330 through one or more air inlets connected to the thermal container and positioned adjacent to the vented firebox, thereby enhancing combustion of the combustible smudging material positioned on the vented firebox. Additionally, the method may include measuring, by use of a pressure sensor, the air pressure within the thermal container 335 during operation thereof and maintaining, through the use of a pressure release valve connected to the thermal container, the air pressure within the thermal container as measured by the pressure sensor between a selected minimum and maximum pressure by opening the pressure release valve 345 when air pressure rises above the selected maximum pressure 340 and closing the pressure release valve 355 when air pressure falls below the selected minimum pressure 350, thereby to increase the level of negative ions in the flue gas generated from the combustion of the combustible smudging materials and enhance distribution of the flue gas. The method may further include measuring, by use of a flue gas sensor, the flue gas content within the thermal container 360 and releasing, by opening a flue gas release valve connected to the thermal container 370, flue gas from the thermal container when the flue gas content measured by the flue gas sensor rises above a selected flue gas level 365, and distributing, by use of a flue gas flow propeller when the flue gas release valve is open, flue gas from the thermal container through one or more flue gas distribution outlets positioned to emit flue gas from the distal end thereof to be directed toward one or more plants 380 for contact therewith so that the flue gas enhances the growth and production of the plants through contact therewith.

In some embodiments, the method may also include orienting one or more flexible flue gas dispersion pipes connected to the distal ends of one or more of the flue gas distribution pipes to direct the flue gas emitted from the flue gas distribution pipes towards one or more of the plants 300 and raising, by use of one or more hydraulic elevators, the one or more flexible flue gas dispersion pipes to a height sufficient to disperse flue gas onto a targeted portion of one or more of the plants 305.

In some embodiments, the method further includes cooling the flue gas 375, by use of a cooling chamber positioned in fluid communication with the thermal chamber, prior to distributing the flue gas toward one or more plants for contact therewith.

In some embodiments of the method, the combustible smudging materials are selected from materials which produce large quantities of negative ions when burnt, such as white sage. In additional embodiments, the non-conductive material included in the one or more walls of the thermal container is positioned to reduce contact between the flue gas and any conductive portions of the thermal container, thereby reducing neutralization of negative ions in the flue gas produced when burning combustible smudging materials disposed within the thermal container. In some embodiments, the non-conductive material is stone.

In another embodiment, a method of combusting materials continuously during a selected period of time so that flue gas output therefrom passes to contact plants for the purposes of horticultural smudging thereby to enhance plant growth and production includes positioning a combustible smudging material within a thermal container 310 including one or more walls being comprised at least partially of a non-conductive material and burning the combustible smudging material 315, thereby producing flue gas containing negative ions. The method may further include measuring, by use of an oxygen sensor, the oxygen content of the air within the thermal container 320 during operation thereof and injecting, when the oxygen content of the air within the thermal container drops below a selected level 325, air from outside the thermal container into the thermal container through one or more air inlets connected to the thermal container 330, thereby enhancing combustion of the combustible smudging material. The method may also include measuring, by use of a flue gas sensor, the flue gas content within the thermal container 360, and releasing, by opening a flue gas release valve connected to the thermal container 370, flue gas from the thermal container onto one or more plants for contact therewith so that the flue gas enhances the growth and production of the plants through contact therewith, when the flue gas content measured by the flue gas sensor rises above a selected flue gas level 365.

Some embodiments of the method may further include measuring, by use of a pressure sensor, the air pressure within the thermal container 335 during operation thereof, and maintaining, through the use of a pressure release valve connected to the thermal container, the air pressure within the thermal container as measured by the pressure sensor between a selected minimum and maximum pressure by opening the pressure release valve 345 when air pressure rises above the selected maximum pressure 340 and closing the pressure release valve 355 when air pressure falls below the selected minimum pressure 350, thereby to increase the level of negative ions in the flue gas generated from the combustion of the combustible smudging materials and enhance distribution of the flue gas.

In some embodiments of the method, the combustible smudging materials are positioned within the thermal container 310 on a vented firebox adjacent to the air inlets, such that air entering the thermal container passes through the vented firebox thereby to enhance combustion of the combustible smudging materials when disposed thereon.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A horticultural smudging system to combust materials continuously during a selected period of time so that flue gas output therefrom passes to contact plants thereby to enhance plant growth and production, the system comprising:

a thermal container to burn combustible smudging materials when disposed within the thermal container to generate flue gas containing negative ions, the thermal container including one or more walls being comprised at least partially of a non-conductive material;

one or more air inlets connected to the thermal container and positioned to allow air from outside the thermal container to enter the thermal container;

a compressed air container connected to the thermal container and positioned in fluid communication with the one or more air inlets, thereby to allow compressed air to flow into the thermal container through the one or more air inlets;

an air regulator connected to the compressed air container and positioned in fluid communication with the compressed air container, the thermal container, and the one or more air inlets, thereby to regulate the flow of air from the compressed air container into the thermal container through the one or more air inlets;

an oxygen sensor connected to the thermal container and positioned to measure oxygen content within the thermal container during operation thereof to control the flow of air through the air regulator responsive to the oxygen sensor when the oxygen content measured by the oxygen sensor drops below a selected oxygen level, thereby to enhance combustion of the combustible smudging materials;

a pressure release valve connected to the thermal container and positioned to allow air and flue gas to escape the thermal container when the pressure release valve is in an open position;

an air pressure sensor connected to the thermal container and positioned to measure the air pressure within the thermal container thereby selectively to open the pressure release valve to allow air to escape when the air pressure within the thermal container rises above a selected pressure level;

a vented firebox, on which to dispose the combustible smudging materials, positioned within the thermal container and adjacent the air inlets, such that compressed air propelled into the thermal container through the air inlets passes through the vented firebox thereby to enhance combustion of the combustible smudging materials when disposed thereon;

one or more flue gas distribution outlets connected to the thermal container and positioned to emit flue gas from the distal end thereof to be directed toward one or more plants for contact therewith;

a flue gas flow propeller positioned to propel flow of flue gas from the thermal container through one or more of the flue gas distribution outlets during operation thereof;

a flue gas release valve positioned to allow the flue gas to pass through one or more of the flue gas distribution outlets when the flue gas release valve is in an open position;

a flue gas release sensor positioned to measure the flue gas levels present in at least a portion of the thermal container thereby selectively to open the flue gas release valve to allow flue gas to pass into the flue gas distribution outlet to be directed toward one or more plants for contact therewith so that the flue gas enhances the growth and production of the plants through contact therewith when the flue gas level within the thermal container rises above a selected flue gas level; and one or more controllers in communication with the oxygen sensor, the air regulator, the pressure release valve, the air pressure sensor, the flue gas release valve, and the flue gas release sensor, to (1) control the flow of air through the air regulator to increase the flow of air into the thermal container when the oxygen content measured by the oxygen sensor drops below a selected oxygen level, (2) control the opening of the pressure release valve when the air pressure measured by the air pressure sensor rises above the selected pressure level, and (3) control the opening of the flue gas release valve and activation of the flue gas flow propeller when the flue gas content measure by the flue gas release sensor rises above the selected flue gas level.

2. The horticultural smudging system of claim 1, further comprising:
  one or more flexible flue gas dispersion pipes attached to the distal end of one or more of the flue gas distribution outlets and capable of being oriented to direct the flue gas emitted from the flue gas distribution outlets towards one or more plants;
  one or more hydraulic elevators connected to one or more of the flexible flue gas dispersion pipes and the flue gas distribution outlets;
  a hydraulic controller in communication with one or more of the hydraulic elevators to control raising one or more of the hydraulic elevators to a height sufficient to disperse flue gas onto a targeted portion of one or more plants.

3. The horticultural smudging system of claim 1, wherein the non-conductive material included in the one or more walls of the thermal container is positioned to reduce contact between the flue gas and any conductive portions of the thermal container, thereby reducing neutralization of negative ions in the flue gas produced when burning combustible smudging materials disposed within the thermal container.

4. The horticultural smudging system of claim 3, wherein the non-conductive material includes stone.

5. The horticultural smudging system of claim 1, further comprising a cooling chamber positioned in fluid communication with the thermal chamber and the flue gas distribution outlets, thereby allowing the flue gas produced when burning combustible smudging materials disposed within the thermal container to cool before being directed toward one or more plants for contact therewith.

6. A horticultural smudging system to combust materials continuously during a selected period of time so that flue gas output therefrom passes to contact plants thereby to enhance plant growth and production, the system comprising:
  a thermal container to burn combustible smudging materials when disposed within the thermal container to generate flue gas containing negative ions, the thermal container including one or more walls being comprised at least partially of a non-conductive material;
  an air regulator connected to the thermal container and positioned to regulate the flow of air into the thermal container;
  an oxygen sensor connected to the thermal container and positioned to measure oxygen content within the thermal container during operation thereof to control the flow of air through the air regulator responsive to the oxygen sensor when the oxygen content measured by the oxygen sensor drops below a selected oxygen level, thereby to enhance combustion of the combustible smudging materials;
  a flue gas release valve positioned to allow flue gas to escape the thermal container when the flue gas release valve is in an open position;
  a flue gas release sensor positioned to measure the flue gas levels present in at least a portion of the thermal container thereby selectively to open the flue gas release valve to allow flue gas to escape the thermal container and be directed toward one or more plants for contact therewith so that the flue gas enhances the growth and production of the plants through contact therewith when the flue gas level within the thermal container rises above a selected flue gas level; and
  one or more controllers in communication with the oxygen sensor, the air regulator, the flue gas release valve, and the flue gas release sensor, to (1) control the flow of air through the air regulator to increase the flow of air into the thermal container when the oxygen content measured by the oxygen sensor drops below a selected oxygen level, and (2) control the opening of the flue gas release valve when the flue gas content measure by the flue gas release sensor rises above the selected flue gas level.

7. The horticultural smudging system of claim 6, further comprising:
  one or more flexible flue gas dispersion pipes in fluid communication with the thermal container and capable of being oriented to direct the flue gas emitted from the thermal container towards one or more plants.

8. The horticultural smudging system of claim 7, further comprising:
  one or more hydraulic elevators connected to one or more of the flexible flue gas dispersion pipes;
  a hydraulic controller in communication with one or more of the hydraulic elevators to control raising one or more of the hydraulic elevators to a height sufficient to disperse flue gas onto a targeted portion of one or more plants.

9. The horticultural smudging system of claim 6, wherein the non-conductive material included in the one or more walls of the thermal container is positioned to reduce contact between the flue gas and any conductive portions of the thermal container, thereby reducing neutralization of negative ions in the flue gas produced when burning combustible smudging materials disposed within the thermal container.

10. The horticultural smudging system of claim 9, wherein the non-conductive material includes stone.

11. The horticultural smudging system of claim 6, further comprising a vented firebox, on which to dispose the combustible smudging materials, positioned within the thermal container, such that air entering the thermal container passes through the vented firebox thereby to enhance combustion of the combustible smudging materials when disposed thereon.

12. The horticultural smudging system of claim 6, further comprising a cooling chamber positioned in fluid communication with the thermal chamber, thereby allowing the flue gas produced when burning combustible smudging materials disposed within the thermal container to cool before being directed toward one or more plants for contact therewith.

13. A method of combusting materials continuously during a selected period of time so that flue gas output therefrom passes to contact plants for the purposes of horticultural smudging thereby to enhance plant growth and production, the method comprising:
  positioning a combustible smudging material within a thermal container including one or more walls being comprised at least partially of a non-conductive material;
  burning the combustible smudging material, thereby producing flue gas containing negative ions;
  measuring, by use of an oxygen sensor, the oxygen content of the air within the thermal container during operation thereof;
  injecting, when the oxygen content of the air within the thermal container drops below a selected level, air from outside the thermal container into the thermal container through one or more air inlets connected to the thermal container, thereby enhancing combustion of the combustible smudging material;
  measuring, by use of a flue gas sensor, the flue gas content within the thermal container; and
  releasing, by opening a flue gas release valve connected to the thermal container, flue gas from the thermal container onto one or more plants for contact therewith so that the flue gas enhances the growth and production of the plants through contact therewith, when the flue gas content measured by the flue gas sensor rises above a selected flue gas level.

14. The method of claim 13, further comprising:

measuring, by use of a pressure sensor, the air pressure within the thermal container during operation thereof; and maintaining, through the use of a pressure release valve connected to the thermal container, the air pressure within the thermal container as measured by the pressure sensor between a selected minimum and maximum pressure by opening the pressure release valve when air pressure rises above the selected maximum pressure and closing the pressure release valve when air pressure falls below the selected minimum pressure, thereby to increase the level of negative ions in the flue gas generated from the combustion of the combustible smudging materials and enhance distribution of the flue gas.

15. The method of claim 13, wherein the combustible smudging materials are selected from materials which produce large quantities of negative ions when burnt.

16. The method of claim 15, wherein the combustible smudging material comprises white sage.

17. The method of claim 13, further comprising cooling the flue gas, by use of a cooling chamber positioned in fluid communication with the thermal chamber, prior to releasing the flue gas on one or more plants for contact therewith.

18. The method of claim 13, wherein the combustible smudging materials are positioned within the thermal container on a vented firebox adjacent to the air inlets, such that air entering the thermal container passes through the vented firebox thereby to enhance combustion of the combustible smudging materials when disposed thereon.

* * * * *